US009292406B2

(12) United States Patent
Karayi et al.

(10) Patent No.: US 9,292,406 B2
(45) Date of Patent: Mar. 22, 2016

(54) MONITORING THE PERFORMANCE OF A COMPUTER

(75) Inventors: Sumir Karayi, London (GB); Mark Blackburn, London (GB); Andrew Hawkins, London (GB); Richard Cudd, London (GB); Sophie Chang, London (GR)

(73) Assignee: 1E LIMITED, London (GB)

( * ) Notice: Subject to any disclaimer, the term of this patent is extended or adjusted under 35 U.S.C. 154(b) by 1288 days.

(21) Appl. No.: 12/860,862

(22) Filed: Aug. 21, 2010

(65) Prior Publication Data

US 2011/0093588 A1 Apr. 21, 2011

(30) Foreign Application Priority Data

Sep. 2, 2009 (GB) .................................. 0915233.1

(51) Int. Cl.
*G06F 11/34* (2006.01)
*G06F 1/32* (2006.01)
*G06F 11/30* (2006.01)

(52) U.S. Cl.
CPC .......... *G06F 11/3466* (2013.01); *G06F 1/3209* (2013.01); *G06F 11/3062* (2013.01); *G06F 11/3089* (2013.01); *G06F 11/3409* (2013.01); *G06F 2201/81* (2013.01); *G06F 2201/86* (2013.01); *G06F 2201/88* (2013.01); *Y02B 60/165* (2013.01)

(58) Field of Classification Search
USPC .................................................. 702/182–199
See application file for complete search history.

(56) References Cited

U.S. PATENT DOCUMENTS

| 3,602,703 | A | * | 8/1971 | Polenz | H02J 3/14 |
| | | | | | 700/291 |
| 5,396,635 | A | * | 3/1995 | Fung | G06F 1/3203 |
| | | | | | 713/323 |
| 5,590,056 | A | * | 12/1996 | Barritz | G06F 11/3466 |
| | | | | | 702/186 |
| 5,623,647 | A | * | 4/1997 | Maitra | G06F 1/206 |
| | | | | | 713/501 |
| 5,655,081 | A | * | 8/1997 | Bonnell | G06F 11/0748 |
| | | | | | 709/202 |
| 6,230,204 | B1 | * | 5/2001 | Fleming, III | G06F 11/3414 |
| | | | | | 709/224 |
| 6,691,067 | B1 | * | 2/2004 | Ding | G06F 11/3447 |
| | | | | | 702/186 |
| 6,829,713 | B2 | | 12/2004 | Cooper | |
| 6,862,589 | B2 | * | 3/2005 | Grant | G05B 19/19 |
| | | | | | 702/183 |
| 6,885,974 | B2 | | 4/2005 | Holle | |

(Continued)

FOREIGN PATENT DOCUMENTS

| EP | 0666526 A1 | 8/1995 |
| EP | 0978879 A2 | 2/2000 |

(Continued)

*Primary Examiner* — Backhean Tiv
(74) *Attorney, Agent, or Firm* — EIP US LLP

(57) ABSTRACT

A computer implemented method of monitoring the performance of a computer comprises determining the value of an activity metric of the monitored computer. The contribution(s) to the said value of one or more predetermined activities is/are determined In one embodiment, the said contribution(s) are subtracted from the said total value to provide a net value representing a measure of the performance of the computer. A predetermined data set may be used to identify the one or more predetermined activities. In another embodiment, the value of at least one activity metric of the monitored computer is determined excluding contributions to that value from the said one or more predetermined activities identified from the said data set to provide a net value representing a measure of the performance of the computer. The net value may be used to control the power consumption of the computer.

23 Claims, 9 Drawing Sheets

(56) References Cited

U.S. PATENT DOCUMENTS

| | | | |
|---|---|---|---|
| 6,901,442 B1* | 5/2005 | Schwaller | H04L 43/0817 709/223 |
| 6,961,716 B2* | 11/2005 | Rhodes | H04L 41/142 370/203 |
| 6,990,593 B2 | 1/2006 | Nakagawa | |
| 7,069,558 B1 | 6/2006 | Stone et al. | 718/104 |
| 7,080,271 B2 | 7/2006 | Kardach | |
| 7,099,943 B1* | 8/2006 | Tondering | G06F 9/50 370/230 |
| 7,130,770 B2* | 10/2006 | Di Palma et al. | 702/186 |
| 7,222,269 B2 | 5/2007 | Kurinami | |
| 7,277,821 B2* | 10/2007 | Ochi | G06F 11/3495 702/182 |
| 7,325,234 B2* | 1/2008 | Smith | 718/104 |
| 7,383,548 B2* | 6/2008 | Boon et al. | 718/102 |
| 7,421,413 B2 | 9/2008 | Frank | |
| 7,421,491 B2 | 9/2008 | Tameda | |
| 7,542,437 B1* | 6/2009 | Redi | H04W 52/0206 370/311 |
| 7,647,513 B2 | 1/2010 | Tobias | |
| 7,725,296 B1* | 5/2010 | Becker | G06F 11/3409 702/183 |
| 7,813,897 B2* | 10/2010 | Lee | G06F 11/3419 702/186 |
| 7,962,704 B2* | 6/2011 | Fujibayashi et al. | 711/154 |
| 8,090,752 B2* | 1/2012 | Zedlitz et al. | 707/814 |
| 8,117,614 B2* | 2/2012 | Greiner | G06F 9/30003 718/1 |
| 8,131,855 B2* | 3/2012 | Watanabe et al. | 709/226 |
| 8,135,795 B2* | 3/2012 | Birkestrand | G06F 9/50 709/208 |
| 8,166,270 B2* | 4/2012 | Fujibayashi et al. | 711/170 |
| 8,180,716 B2* | 5/2012 | Kshirsagar | G06F 9/5083 702/186 |
| 8,185,753 B2* | 5/2012 | Oe | G06F 1/28 700/286 |
| 8,392,147 B2* | 3/2013 | Karayi | G06F 1/3203 702/186 |
| 8,458,498 B2* | 6/2013 | Rotem et al. | 713/320 |
| 8,484,355 B1* | 7/2013 | Lochhead et al. | 709/226 |
| 8,743,776 B2* | 6/2014 | Gurajala | G06Q 30/016 370/328 |
| 2002/0004912 A1 | 1/2002 | Fung | |
| 2002/0198984 A1* | 12/2002 | Goldstein | G06F 11/323 709/224 |
| 2003/0009705 A1* | 1/2003 | Thelander | G06F 1/3203 713/340 |
| 2003/0014482 A1* | 1/2003 | Toyota | G06Q 10/10 709/203 |
| 2003/0055969 A1 | 3/2003 | Begun | |
| 2003/0061448 A1* | 3/2003 | Rawson, III | 711/133 |
| 2003/0196126 A1 | 10/2003 | Fung | |
| 2004/0068559 A1* | 4/2004 | Shaw | G06F 21/316 709/224 |
| 2004/0133395 A1* | 7/2004 | Ding | G06F 11/3452 702/182 |
| 2004/0267897 A1* | 12/2004 | Hill et al. | 709/217 |
| 2005/0015501 A1* | 1/2005 | Kaplan | G06Q 30/06 709/228 |
| 2005/0091310 A1* | 4/2005 | Salomon | G06F 9/5077 709/203 |
| 2005/0149939 A1* | 7/2005 | Noeske | G06F 9/5011 718/104 |
| 2006/0161648 A1* | 7/2006 | Ding | G06F 11/3452 709/224 |
| 2006/0212269 A1* | 9/2006 | Lee | G06F 11/3419 702/186 |
| 2006/0287739 A1* | 12/2006 | Bivens | G06F 11/3409 700/32 |
| 2007/0150578 A1* | 6/2007 | de Almeida | H04L 63/04 709/223 |
| 2007/0206511 A1* | 9/2007 | Purpura | H04L 12/24 370/252 |
| 2008/0072232 A1* | 3/2008 | O'Toole, Jr. | G06F 9/505 718/104 |
| 2008/0133749 A1* | 6/2008 | Sample | G06F 11/3495 709/224 |
| 2008/0189077 A1* | 8/2008 | Iijima | G06F 11/3414 702/186 |
| 2008/0249746 A1* | 10/2008 | Bivens | G06F 11/3409 702/186 |
| 2008/0288216 A1* | 11/2008 | Lee | G06F 11/3419 702/186 |
| 2008/0306985 A1* | 12/2008 | Murray | G06Q 10/10 |
| 2009/0048807 A1* | 2/2009 | Kikuchi | G06F 11/3409 702/186 |
| 2009/0157702 A1* | 6/2009 | Harris | G06F 9/4451 |
| 2009/0217065 A1* | 8/2009 | Araujo, Jr. | G06F 1/3203 713/320 |
| 2009/0300173 A1* | 12/2009 | Bakman et al. | 709/224 |
| 2009/0327764 A1* | 12/2009 | Brey | G06F 1/3203 713/300 |
| 2010/0082300 A1* | 4/2010 | Hollingsworth | G06F 3/0605 702/186 |
| 2010/0268816 A1* | 10/2010 | Tarui | H04L 12/00 709/224 |
| 2010/0312893 A1* | 12/2010 | Watanabe et al. | 709/226 |
| 2011/0022870 A1* | 1/2011 | McGrane et al. | 713/340 |
| 2011/0093588 A1* | 4/2011 | Karayi | G06F 1/3209 709/224 |
| 2011/0219118 A1* | 9/2011 | Cowan et al. | 709/224 |
| 2012/0166649 A1* | 6/2012 | Watanabe | G06F 9/5077 709/226 |
| 2013/0282417 A1* | 10/2013 | Gaedcke | G06Q 30/016 705/7.13 |
| 2015/0081571 A1* | 3/2015 | Chauhan | G06Q 50/01 705/304 |

FOREIGN PATENT DOCUMENTS

| | | | | |
|---|---|---|---|---|
| JP | 2009-135181 | * | 6/2009 | G06F 9/46 |
| WO | WO9531782 | | 11/1995 | |

* cited by examiner

Actual Data
Name of Server
    CPU activity,
    I/O
    Logins
    Incoming TCP/IP connections
    Ports
    Other

Exclusions
Processes, Ports, TCP/IP connections

Thresholds
for net values of activity metrics

Database

Figure 4

MONITORING THE PERFORMANCE OF A COMPUTER

FIELD OF THE INVENTION

The present invention relates to monitoring the performance of a computer. An embodiment of the invention relates to modelling the performance of a computer. The invention also relates to a method of measuring power consumption of a computer.

BACKGROUND OF THE INVENTION

Computers consume electrical energy to operate. They consume electrical energy even when they are apparently idle. An idle computer may consume up to 60% of its fully active power consumption. That is wasteful. Large server farms having hundreds or even thousands of servers consume very large amount of power. The power consumed by a computer is released as heat and server rooms thus require air conditioning equipment which in turn also consume power. It is thus desirable to control the power consumption of computers especially when they are idle. It is known from for example Microsoft Windows (RTM) to provide an idle timer which reduces the power consumption of a computer if for example there has been no input activity for a set period of time.

US-A-2002/0004912 (Fung) discloses power management of computers. Fung discloses several power management schemes including: detection of a predetermined code thread; reduction of power by lowering various clock frequencies or removal of power from system components; while in power saving mode continuing to monitor the occurrence or non-occurrence of a predefined event or activity. Fung also teaches that power management can take place at different OSI levels. For example, power management may occur dependent on:- the number of CPU idle threads within a fixed time period; some statistical evaluation of CPU idleness; handling of TCP/IP packets; or the number of times a specific port address is or has been requested within a fixed time period. These events or activities may be used in combination. Different modes of power saving may be adopted. Fung also discloses a direct transition between a full power mode and an inactive mode.

US-A-2007/0283176 (Tobias et al) discloses power management of a computer to adapt the power level to the performance of the computer. Tobias measures performance using a single utilization index which is the sum of plural Task Utilization values divided by a time T which is the elapsed time between successive measurements of the index. Task Utilization is how much CPU time a task has incurred. The index is compared with high and low thresholds, and power is managed on the basis of the comparisons. Certain tasks, for example tasks below a certain level of priority, may be excluded from the index.

SUMMARY OF THE INVENTION

In accordance with one aspect of the present invention, there is provided a computer implemented method of monitoring the performance of a computer comprising determining the total value of an activity metric of the monitored computer, determining the contribution(s) to the said total value of one or more predetermined activities, and subtracting the said contribution(s) from the said total value to provide a net value representing a measure of the performance of the computer.

In one implementation, the value of only one activity metric is determined.

In another implementation, the values of a plurality of activity metrics are determined.

The said one or more predetermined activities may be identified by a data set stored in a data store, and the data set is used to determine the contributions of which activities are to be subtracted from the said total value(s).

The predetermined activities may be selected by a user or may be preset by a designer of software implementing the method.

An illustrative implementation of the method may be regarded as allowing the control of a computer based on the net useful work it performs. The inventors' inventive insight is that knowing the main purpose of a computer enables a user or designer to select activities (hereinafter referred to as "non-useful activities") which do not contribute to that main purpose and use that to provide a measure of net useful work. Non-useful activities as represented by the predetermined activities are subtracted from the total work done by the computer to provide a measure of net useful work. What is not useful may be a subjective judgement of the designer or user and depends on their judgement of the function to be carried out by the computer. For example a computer which acts as a server in a network has the main function of serving external clients. Activities such as antivirus and defragmentation which do not directly serve the main purpose may be regarded as non-useful to the main purpose of one server but may be regarded as useful to another server.

In accordance with another aspect of the present invention, there is provided a computer implemented method of monitoring the performance of a computer comprising using a predetermined data set to identify one or more activities, and determining the value of at least one activity metric of the monitored computer excluding contributions to that value from the said one or more predetermined activities identified from the said data set.

Determining the value of each activity metric of the computer may comprise summing the contributions of processes running on the monitored computer and network connections active on the monitored computer which are not identified in the said data set.

The invention also provides a method according of measuring the power consumption of a computer, comprising the steps of:

A) determining the proportion of a time period P in which the net value of at least one activity metric of the computer exceeds a predetermined threshold value, where the said net value is determined according to the method of any one of the preceding aspects of the invention;

B) determining the power consumption of the computer over the period P;

C) determining for the period P the proportion of power consumption for which the at least one net value exceeds the predetermined threshold value.

A further aspect of the invention provides a method of modelling power consumption of a computer comprising monitoring the computer to determine the current value V of the activity metric of the CPU of the computer, and determining the power consumption as a function of the current value V, the power consumption of the computer at minimum activity value of the CPU and the power consumption at the maximum activity value of the CPU.

It will be appreciated that embodiments of the invention provide a measuring instrument which measures useful work carried out by a computer.

BRIEF DESCRIPTION OF THE DRAWINGS

FIG. 4 is a schematic diagram of the contents of a database of FIG. 1;

DETAILED DESCRIPTION OF ILLUSTRATIVE METHODS IN ACCORDANCE WITH THE INVENTION

Figure 1:
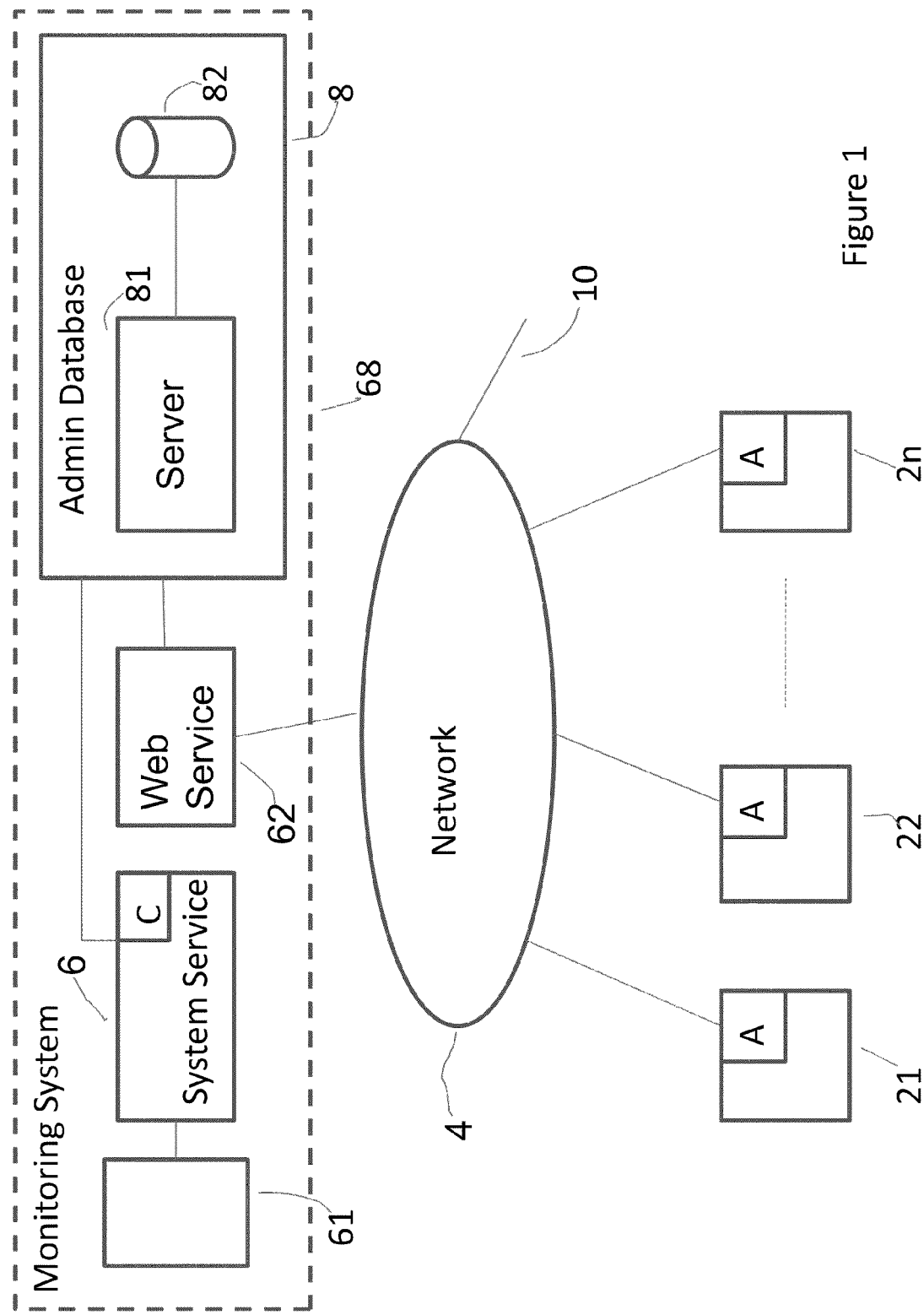
FIG. 1 is a schematic diagram of a network of computers, in this example, servers.
Figure 3:
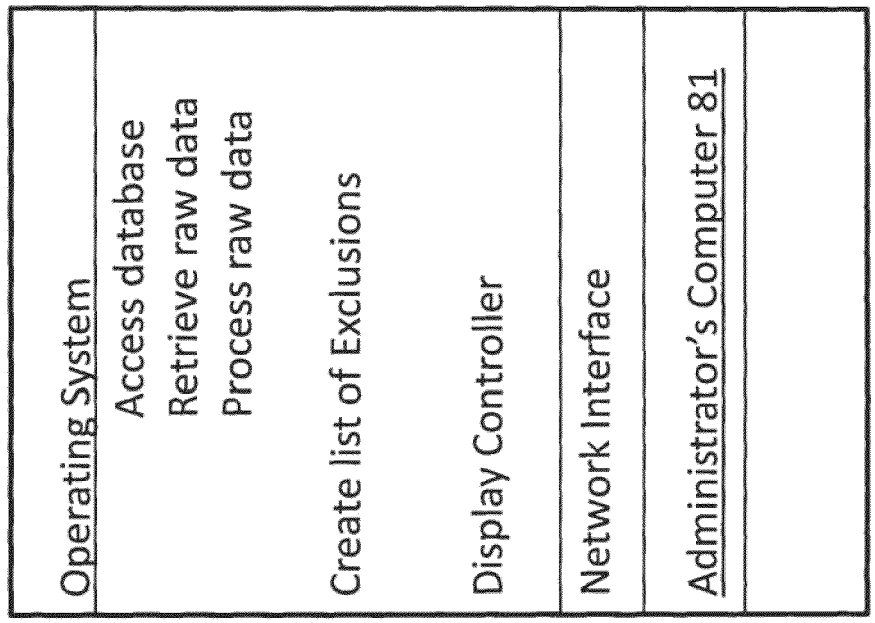
FIG. 3 a schematic diagram of an operating system and programs present on an administrator's workstation of FIG. 1.
Figure 2:
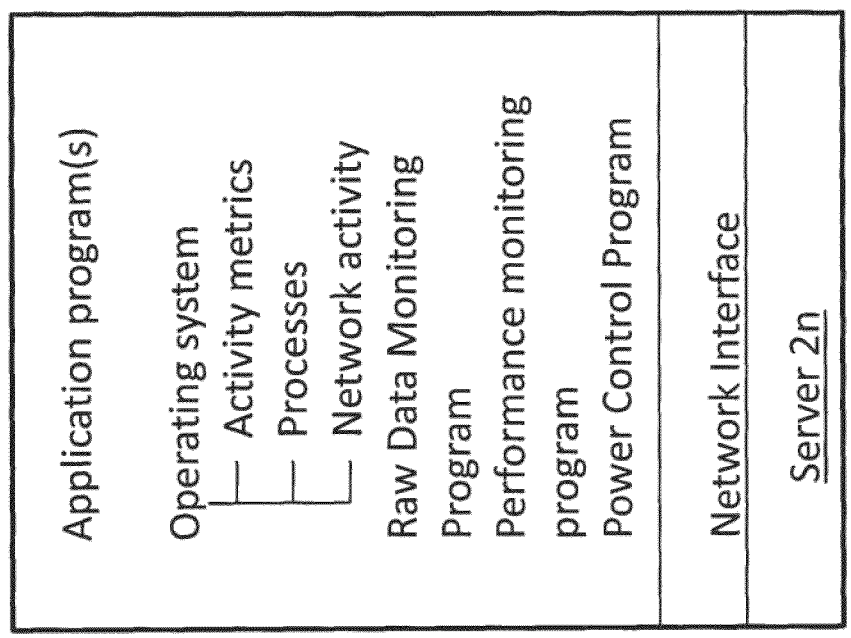
FIG. 2 is a schematic diagram of an operating system and programs present on a server of FIG. 1.

Overview of an Example of a System in Accordance with the Invention: FIGS. 1, 2 and 3

Referring to FIG. 1, the system comprises servers 21, 22, 2n, an administrator's workstation 6 with a display device 61, a web service 62 running on a computer, and an administrative database 8 connected by a network 4. The administrator's console interacts with the database 8. The webservice interacts with the database and the servers 2n. The servers 21 to 2n may be servers of a large server farm having a large number of servers, for example hundreds or more servers. The database may itself comprise a server 81 having a data storage device 82. The database 8 and the workstation 6 together form a monitoring system 68.

In this example of the invention, as illustrated in FIG. 2, each server 2n has, amongst other programs: an operating system; one or more application programs which define the role of the server; a monitoring program, denoted A in FIG. 1, which monitors activity of the server; and a network interface. The monitoring program interacts with the operating system to obtain the data including information identifying the server and other data, relating to the activities of the computer as described herein below. The monitoring program sends the raw monitored data to the database 8 via the network interface, the network 4 to the webservice 62 which transfers the raw data to the database 8. In this example, the monitoring programs A communicate with the webservice using the http protocol.

Each server 2n may have a power control program which controls the power state of the server as described herein. The power control program interacts with the operating system to obtain data relating to the activities of the computer. Power control is performed on the basis of settings downloaded by the server 2n from the database. The settings are created by the administrator. The power control program interacts with the performance monitoring program.

In this example, as indicated in FIG. 3, the administrator's workstation 6 has, amongst other programs, an operating system, a network interface, a display controller, and a program for interfacing with the database.

Referring to FIG. 4, the database stores the raw data provided by the monitoring program of a server. In this example the raw data comprises; the name of the server: metrics of CPU activity, I/O, logins, and incoming TCP/IP connections: names of processes; and identification of incoming TCP/IP connections by a combination of port number used and processes associated with the port and the connection. The database may also store source IP addresses of incoming network connections and other data for example data identifying any connection to a process X, or any connection to a port Y or any connection from a source address Z.

The raw data is analysed as discussed below and a data set of excluded processes and a data set of excluded incoming TCP/IP connections identified by a combination of port number and associated process(es) are stored. Also thresholds of activity metrics are stored.

Figure 5:
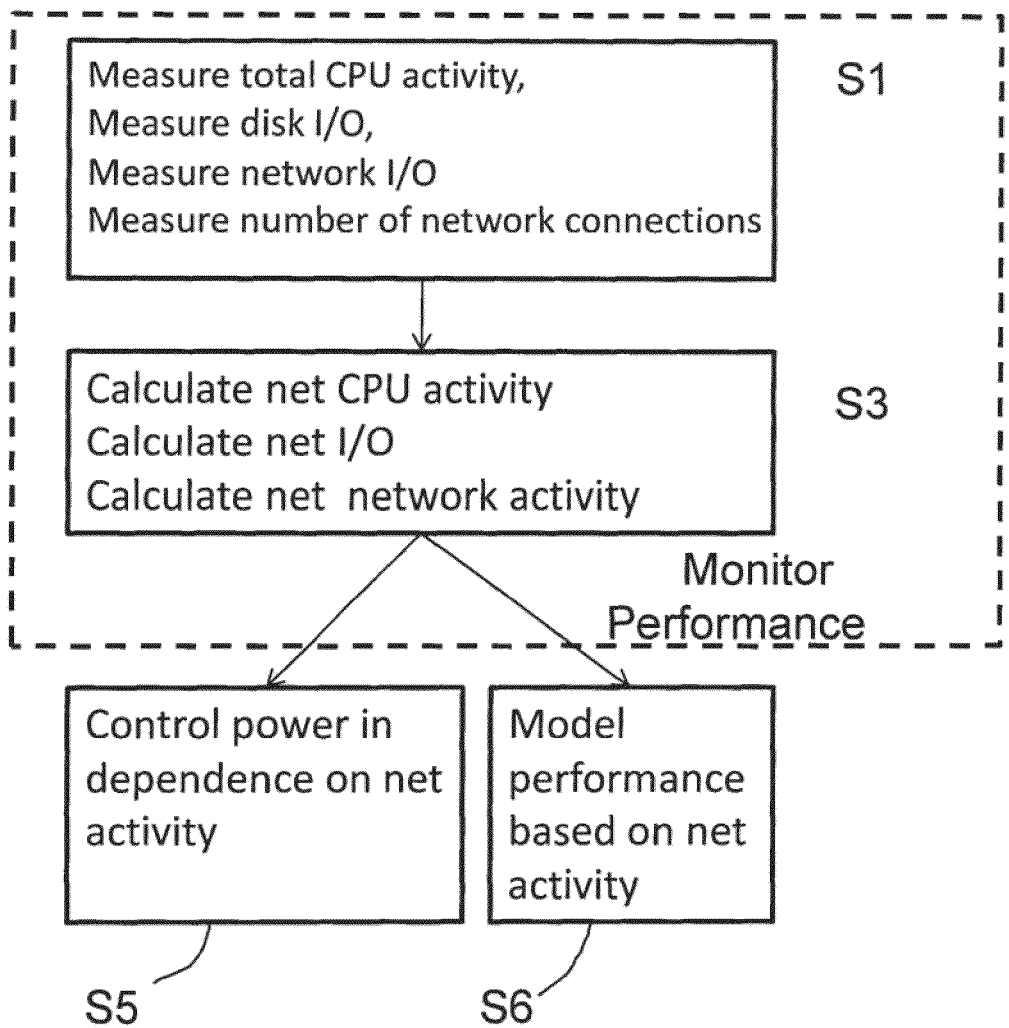
FIG. 5 is a flow chart illustrating a method of controlling a computer, and/or modelling performance of a computer, in accordance with an example of the present invention.

Overview: FIG. 5

The illustrative methods use net values of activity. In the method of FIG. 5, the method uses net CPU activity, net I/O data amounts and net number of TCP/IP connections as measures of the performance of a computer. These net values are the total values of those activity metrics minus contributions to those total values from predetermined activities. In one example, those predetermined activities are activities which are considered to not contribute directly to the main purpose of the computer and are referred to as excluded activities. Measurement of the net values will be discussed in more detail with reference to FIGS. 6 to 8 below.

Referring to FIG. 5, the performance monitoring method of FIG. 5 determines the amount of net useful activity S1 and S3. Net useful activity is measured by determining the total activity in step S1 and in step S3 subtracting from the total the contributions of "excluded activities" which are activities predetermined to be non-useful to the main purpose of the computer.

The method may additionally control S5 the power of the computer in dependence on the net useful activity. For example if there is no net useful activity, the computer is controlled to adopt a low power state which will be described below in more detail. The method may additionally, or alternatively, model S6 the performance of the computer based on the net useful activity.

Figure 6:
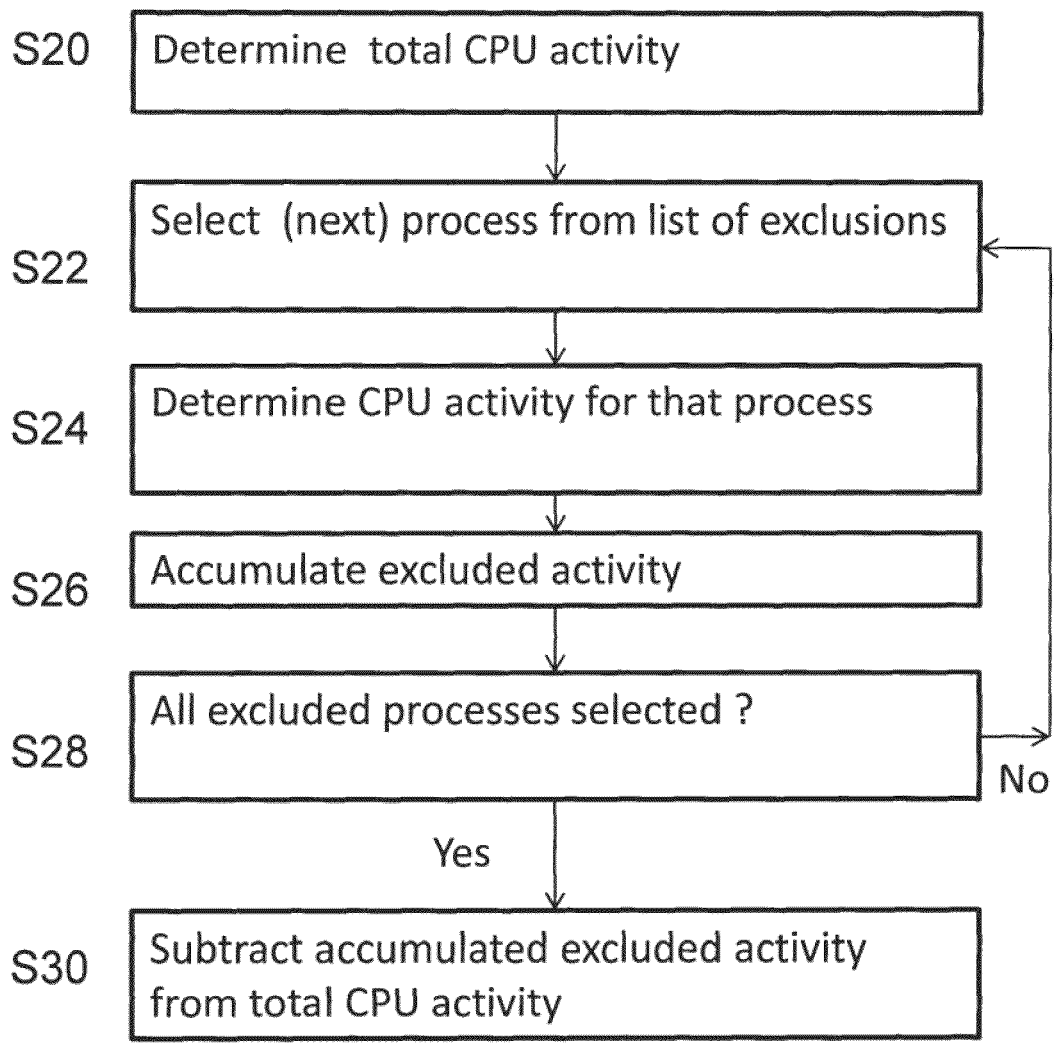
FIG. 6 is a diagram illustrating the calculation of net CPU activity.

Determine Net Useful CPU Activity: FIG. 6

Net useful CPU activity is measured as shown in FIG. 6. The measurement of net useful activity is based on a data set (referred to herein as a list) of processes, referred to herein as excluded processes, determined in advance to be non-useful activities. (The production of the data set is described below in the section "Creating Data Sets. . . ").

In the following description it is assumed that activity is measured over a predetermined monitoring interval t which may be one minute or nay other selected time interval. In the following description the monitoring intervals occur regularly but in other implementations each monitoring interval may be initiated by an event for example upon a process starting or ending, a network connection occurring or a logon occurring.

In step S20, the total activity of a CPU is determined and the total value is stored. The total value includes contributions from all processes running on the computer at the time of measurement plus activity attributable to the kernel of the operating system.

In steps S22 to S28, the contributions to the total value from all the excluded processes running at the time of measurement of the total are determined and subtracted from the total value to produce a net value. In this example that is done by selecting a process in step S22 from a list of excluded processes, determining the activity value attributable to that excluded process in step S24, storing the activity value in an accumulator in step S26 and then at steps S28 and S22 selecting the next process and adding its activity value to the value stored in the accumulator in step S26. Once all the processes have been selected the value accumulated in step S26 is subtracted in step S30 from the total stored in step S20 to give the net value.

It will be appreciated that there are other methods of determining net useful CPU activity. For example the activity values of the excluded processes may be subtracted one at a time from the total CPU activity instead of accumulating all the activity values and then subtracting the accumulated values from the total CPU activity value.

The total activity of the CPU and the activity values of the processes are derived from the operating system in known manner using performance counters.

Figure 7:
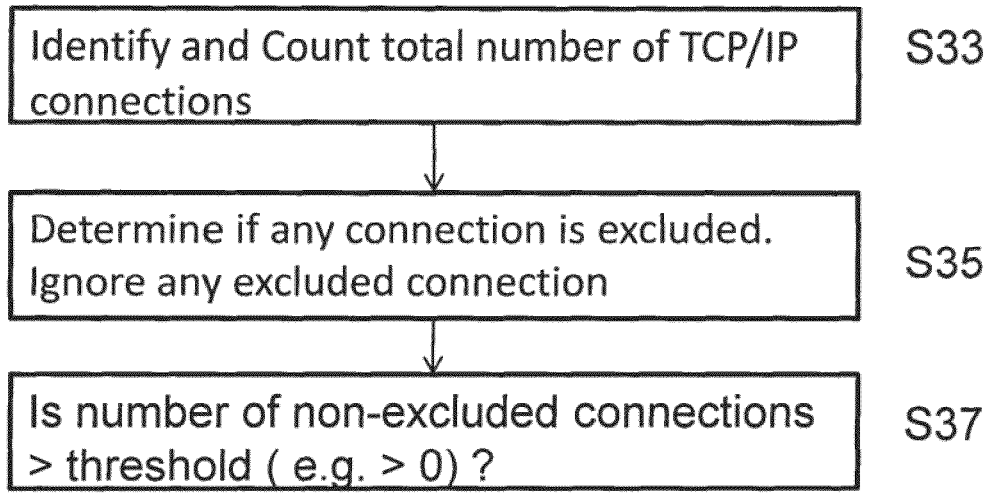
FIG. 7 is a diagram illustrating determining a net number of TCP/IP connections.

Determine Net Useful TCP/IP Connections: FIG. 7

Net useful connections are determined in each monitoring interval t as shown in FIG. 7. The incoming TCP/IP connections are identified in step S33. As with CPU activity there is a list of excluded connections. The excluded connections are identified in step S35 and ignored. Step S37 determines if the number of non-excluded incoming connections exceeds a threshold. In an example the threshold is zero, so if there is a single non-excluded incoming TCP/IP connection, that is sufficient to indicate useful activity. Steps S35 and S37 may be achieved by continuously monitoring incoming TCP/IP connections. Any useful connection, i.e. one not on the excluded list, sets a flag; connections on the list are ignored.

In an alternative implementation, in a time slot t, the total number of all incoming TCP/IP connections is determined, the number of those connections on the excluded list is determined and the number of excluded connections is subtracted from the total number of all incoming TCP/IP connections.

The identification of an incoming TCP/IP connection is achieved using port numbers and processes which are provided by instrumentation data provide by the operating system. Information on how to do this is available from Microsoft Corporation for operating systems supplied by them but the invention is not limited to Microsoft operating systems. The list of excluded incoming TCP/IP connections is list of port numbers and processes associated with those port numbers. The following may also be identified and used in the list:- source IP addresses of incoming network connections, and other data for example for example data identifying any connection to a process X, or any connection to a port Y or any connection from a source address Z.

Figure 8:
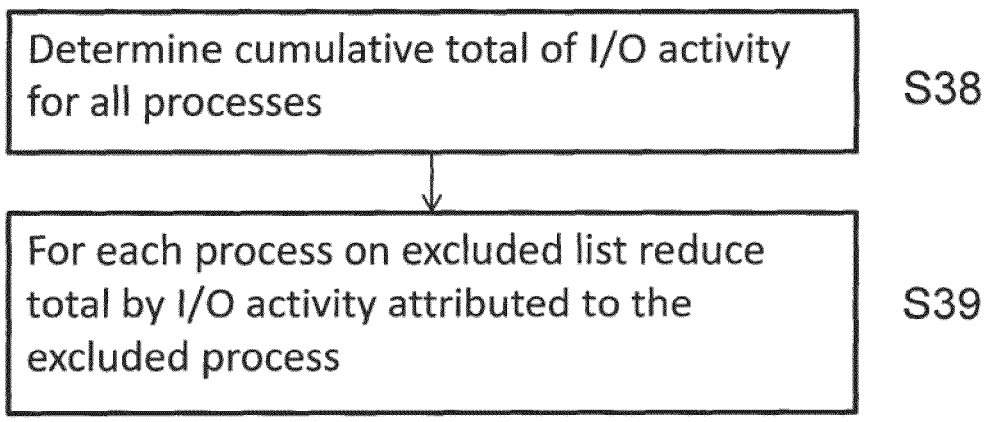
FIG. 8 a diagram illustrating the calculation of net I/O activity.

Determine Net Useful I/O Activity: FIG. 8

The measure of I/O activity is the average number of bytes being read and written in the monitoring interval t.

In this example, I/O activity is a single value which is the sum of network I/O, disc I/O and device I/O.

Net useful I/O activity is determined as shown in FIG. 8. In step S38, the total I/O activity is determined and the total value is stored. The total value includes contributions from all processes running on the computer at the time of measurement plus activity attributable to the kernel of the operating system. In step S39, the activity of each excluded process is subtracted from the total activity of step S38 and the net value determined.

Steps S38 and S39 may be implemented as shown in FIG. 6 with I/O activity substituted for CPU activity. The list of excluded processes is the same for both CPU activity and I/O activity in this example but different lists may be used for CPU activity and I/O activity.

I/O activity associated with the storage of the computer may be monitored separately from network I/O. Also I/O activity of a device may be monitored separately. If so, net useful values are determined separately for each type of I/O activity.

Figure 9:
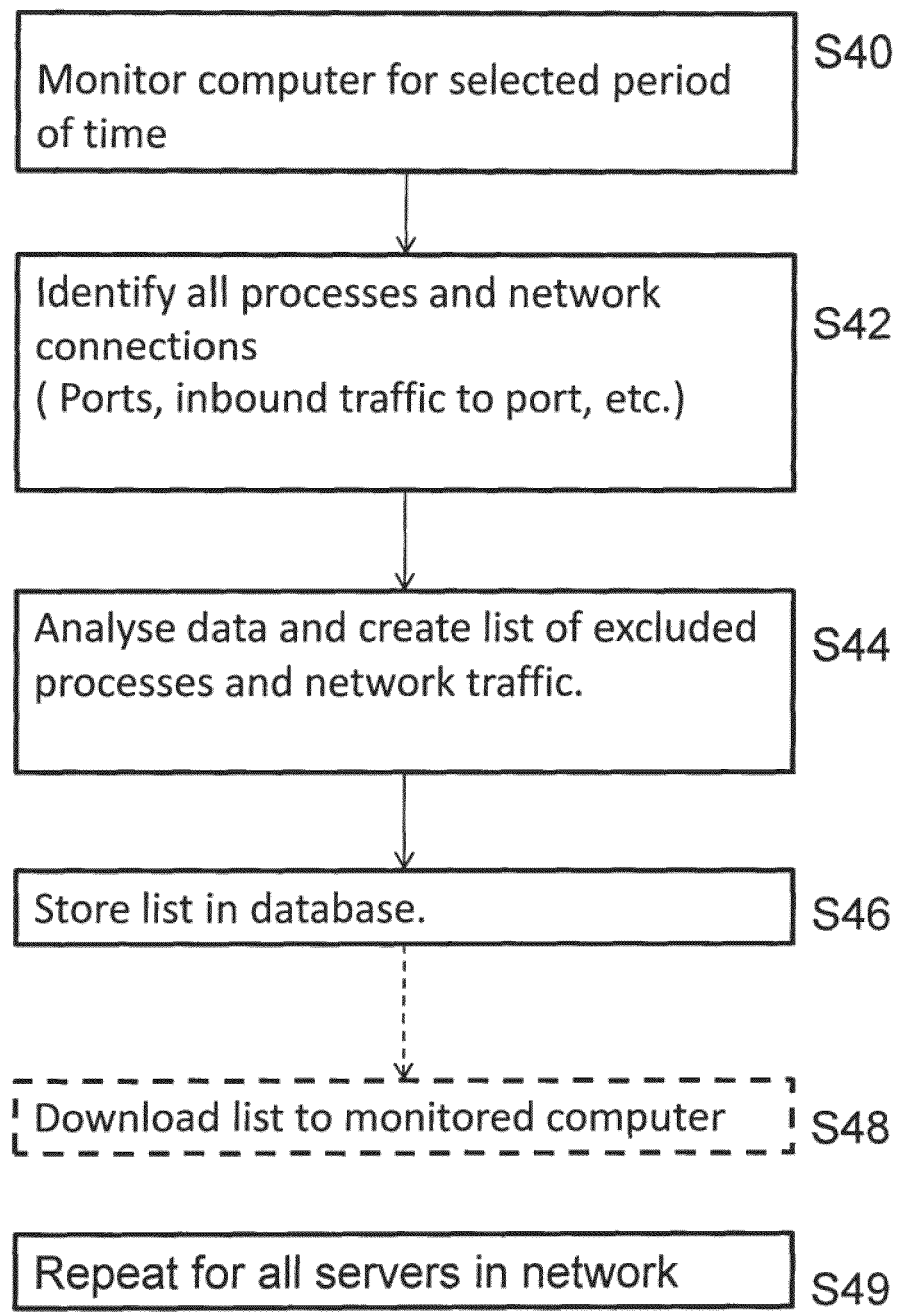
FIG. 9 is a diagram illustrating the production of a list of excluded activities.

Creating Data Sets of Excluded Processes and Incoming TCP/IP Connections: FIG. 9

As discussed above the embodiments of the invention use data sets of excluded processes and incoming TCP/IP connections. The data sets may be lists. An excluded incoming TCP/IP connection is identified by the combination of a port number and a process.

To produce the data lists, in step S40 of FIG. 9, a computer is monitored for a suitable period of time. The time may be a day, a week, a month or any other time deemed to be suitable. The time should be long enough to be confident that all activity of the monitored computer is monitored. The monitoring is done by an agent on the monitored computer which obtains process names and port numbers from the operating system in known manner as discussed above, and transmits the combinations of process names and port numbers to the database of FIG. 1. The agent may also obtain other data for example the source address of any incoming network connection, and other data for example data identifying any connection to a process X, or any connection to a port Y or any connection from a source address Z.

Step S42 identifies all processes run on the computer over the monitoring period, and all incoming network connections of that period. The names of the processes are stored and the combinations of port numbers and process names identifying network connections are stored.

In step S44, a person, for example a network administrator, analyses the stored process names and names of ports and processes identifying network connection. The person creates a first data set of excluded processes and a second data set of excluded network connections identified by the combinations of process names and port numbers. Other data may be used the source address of an incoming network connection, or data identifying any connection to a process X, or any connection to a port Y or any connection from a source address Z.

The person uses their judgment to produce the data sets. The person also uses their judgment to set threshold values for the net useful values. In step S46, the data sets and thresholds are stored in the database of FIG. 1.

In step S48, the data sets and the thresholds are downloaded to the monitored computer for use by the agent on the monitored computer which controls the power of the computer.

One data set may be created for all servers in the network. Alternatively, different data sets may be created for different servers. As indicated by step S49, the method of creating data sets may be repeated for all servers in the network or for groups of like servers of the network.

Figure 10:
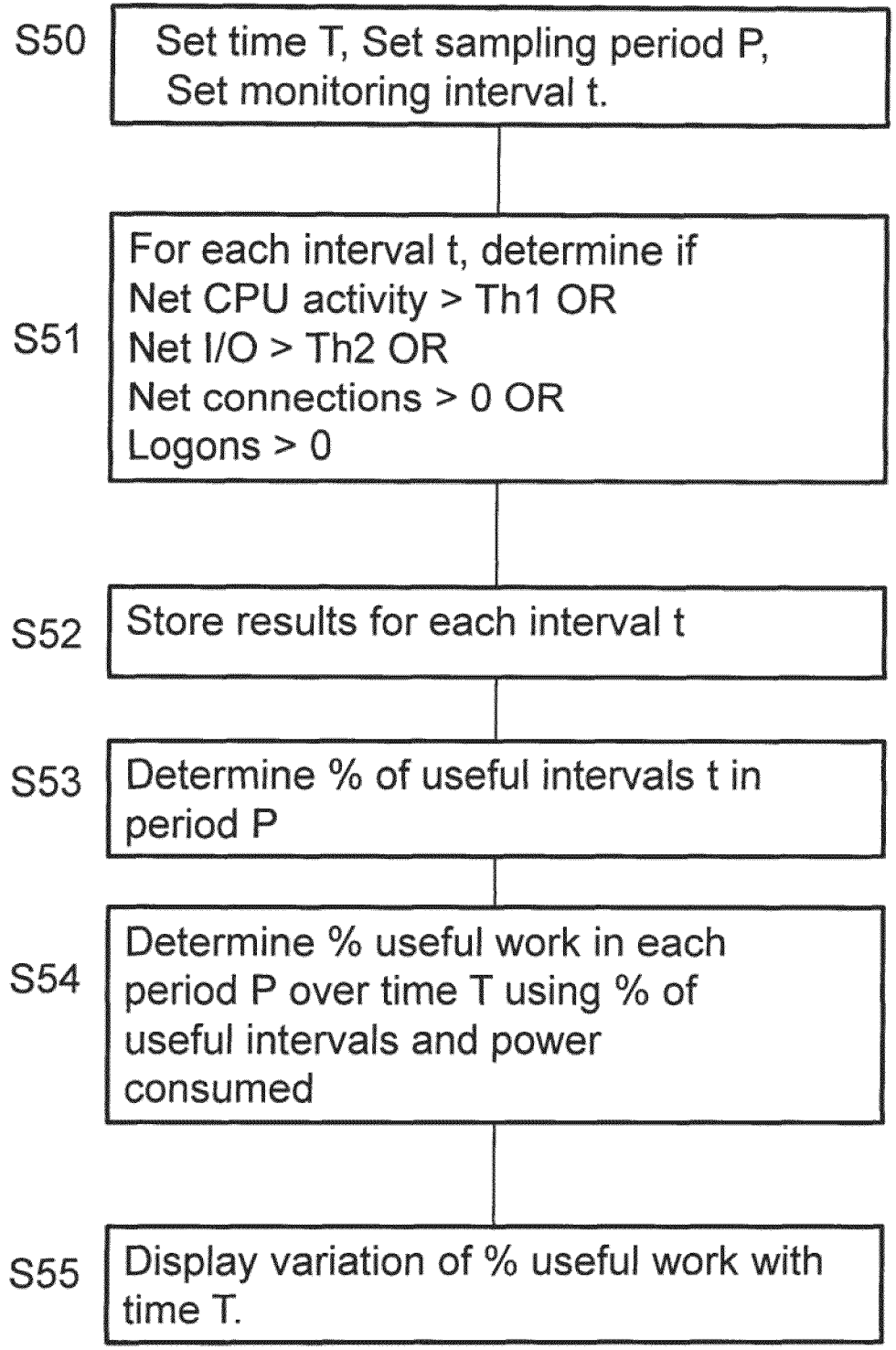
FIG. 10 is a flow diagram of a method of modelling the performance of a computer with time.
Figure 11:
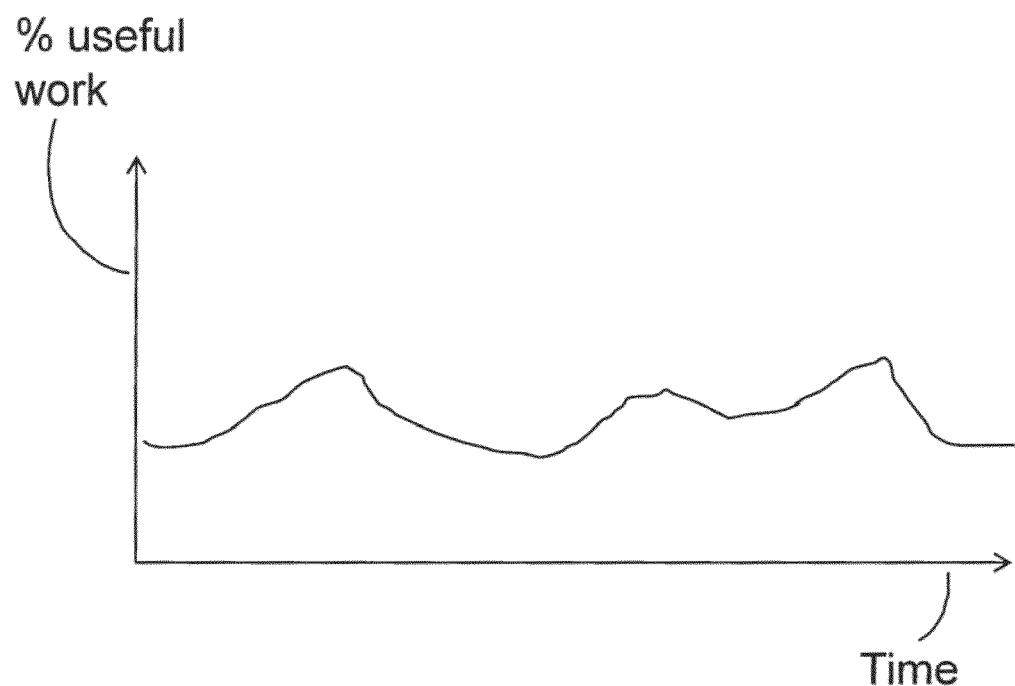
FIG. 11 is a time diagram schematically illustrating variation of performance of a computer with time in accordance with the method of FIG. 10.

Modelling Useful Work: FIGS. 10 and 11

Referring to FIGS. 10 and 11, it is desirable to provide to a user or administrator a model or visualisation of the variation with time of the useful work carried out by a computer. The administrator can use the model or visualisation to control the computer, e.g. to apply power control to it, switch it off, or decommission it.

Referring to FIG. 11, a computer is monitored over a time T. Within the time T, there are sampling intervals P which are divided into monitoring intervals t. In an example, P=20 minutes and t=one minute. T is any selected period, for example one day or more. The monitoring intervals t and the sampling intervals P occur regularly in this example. The value of "% useful work" is determined for each sampling interval P.

Referring to FIG. 10, in step S50 the time T, the sampling period P and the monitoring interval t are set. Step S51 determines, for each monitoring interval in a sampling period P, whether the monitoring interval t includes any useful work. That is done by determining if any one or more of net CPU activity, net I/O activity, net number of incoming TCP/IP connections and number of logons exceeds its associated threshold value. The threshold is zero for logons and numbers of incoming network connections in this example. The net values are determined as described herein above with reference to FIGS. 6 to 9.

In step S52 the result for each monitoring interval t is stored. Step S53 determines from the results stored in step S52 the proportion of monitoring intervals t in the sampling period P in which useful work occurs.

Step S54 determines the % useful work in the sampling period P using the proportion determined in step S54 and a measure M of power consumption of the computer over the period P. In this example the % useful work of a sampling period P is $$M*(\text{number of monitoring intervals containing useful work/total number of monitoring intervals})*100.$$

That is repeated for successive periods P over time T. In step S55, the result is displayed as a model or visualisation of the variation of % useful work over time T. The model may be displayed on the administrator's display device 61 of FIG. 1.

This provides a simple and effective visualisation of the variation of useful work over time in terms of power consumption and is simple to implement.

Measuring Power Consumption

The value M of power consumption in a period P used in step S54 may be determined as $$M = \text{PowerAtMin} + (((\text{PowerAtMax} - \text{PowerAtMin})/100)*\text{CPU value})$$

where
PowerAtMin is the power consumption of the CPU at minimum activity, PowerAtMax is the power consumption of the CPU at maximum activity, and CPU value is the average value of the CPU activity metric over the period P.

PowerAtMin and PowerAtMax may be predetermined values stored in a database containing those values for various makes and models of computers. CPU activity is obtained from the operating system as discussed above. The value M may be adjusted for frequency of operation and number of cores of the CPU.

The measurement of the value M may be done independently of the method of FIGS. 10 and 11.

This technique of measuring power consumption is effective and easy to implement avoiding the need to measure power consumption directly. It uses the CPU activity metric which is available from the operating system and predetermined values stored in a database.

Low Power State

As described above, if power control is implemented, the computer is initially in a full power state, and it adopts a low power state in dependence on the net activity level.

Examples of low power states include, amongst others:
 i) The server is set to operate in its lowest power state whilst still fully operational. For example the CPU is controlled to operate in its minimum power state with the clock at its lowest frequency setting, and network cards and other cards of the server are set to their lowest power state and lowest frequency of operation;
 ii) Sleep/Standby—The processor is powered down but the system state is preserved as the memory subsystem (RAM) which remains powered;
 iii) Hibernate—The processor and RAM are powered down and the system state stored in non-volatile memory, e.g. hard disk; and
 iv) Shut down—The Computer is powered down but power may be applied to certain components such that the server can be triggered to wake-up.

Variants

The above described implementations are to be understood as illustrative examples of the invention. Further embodiments of the invention are envisaged.

For example:

The example described above monitors incoming TCP/IP connections. The invention is not limited to TCP/IP but may be applied to other connection oriented communications protocols. The invention is not limited to monitoring incoming connections: it may monitor outgoing connections in addition to or instead of incoming connections.

Logons may be deemed to be useful activity. A single logon may be useful activity but the invention is not limited to a single logon: it may require a minimum number of logons greater than one to signify useful work. An embodiment of the invention may use a data set of one or more excluded logons. For example a logon which is not associated with an external service may be deemed to be non-useful activity.

The servers 2n of the network of FIG. 1 may all be controlled in the same way with the same data sets of excluded processes and network connections. However, the servers 2n may be controlled using different data sets of excluded processes and network connections. Each server may be separately monitored to create data sets specific to that server. The data sets specific to a server would be stored in the database with an identifier which associates the data sets with the specific server.

Whilst examples of the invention have been described which involve monitoring a plurality of activities, for example CPU activity, I/O activity, and network connections. However, the invention may be implemented by monitoring only one activity, for example CPU activity alone; or two activities for example CPU activity and I/O activity. Four or more activities may be monitored. For example a single measure of I/O activity may be replaced by separate measures of network I/O, disk I/O and device I/O.

Whilst the invention has been described by way of example as using programs running on each of the servers 2n to monitor the performance of the servers. The servers may be monitored remotely. If power control is used, the power control may be done remotely.

Computer Programs and Program Carriers

The invention may be implemented by a program or a set of programs, comprising program code which when run on a computer or set of computers causes the computer(s) to implement the methods described herein above. In one implementation of the invention:

a program is provided to monitor a server to provide data to the database for the purpose of producing the data sets of excluded activities;

a program is provided on each server 2n to monitor performance;

a program is provided on the administrator's workstation to enable the administrator to analyse the data received from the monitoring programs on the servers to produce the data set of excluded activities;

a program is provided to model variation of performance; and a program is provided to model power.

The programs may be carried by one or more articles or carriers. A carrier may be a signal, a communications channel, or a computer readable medium. A computer readable medium may be an article for example: a tape: a disc for example a CD or DVD: a hard disc: an electronic memory; or any other suitable non transitory carrier or data storage medium. The electronic memory may be a ROM, a RAM, Flash memory or any other suitable electronic memory device whether volatile or non-volatile.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What we claim is:

1. A method of producing a measure of performance of a computer, comprising:

determining, from an operating system on a computer, a total value of an activity metric of the computer;

determining, from the operating system, values of contributions of one or more predetermined activities to said total value;

subtracting the values of the contributions from the total value to provide a net value representing the measure of performance of the computer;

determining a proportion of a time period P in which the net value of said activity metric of the computer exceeds a predetermined threshold value;

determining a power consumption of the computer over the time period P; and determining for the time period P, a proportion of power consumption for which the net value of said activity metric exceeds the predetermined threshold value;

wherein the determined power consumption is:

$$PowerAtMin+(((PowerAtMax-PowerAtMin)/100)*CPU\ value)$$

and wherein:

PowerAtMin is the power consumption of the CPU at minimum CPU activity,

PowerAtMax is the power consumption of the CPU at maximum CPU activity, and

CPU value is the average value of the CPU activity metric over the time period P.

2. The method according to claim 1, wherein said one or more predetermined activities are identified by a data set stored in a data store, and the data set is used to determine activities the contributions of which are subtracted from said total value.

3. The method according to claim 1, wherein a said activity metric is a value of activity of a CPU of the computer and said one or more predetermined activities are processes.

4. The method according to claim 1, wherein a said activity metric is a value of I/O activity and said one or more predetermined activities are processes.

5. The method according to claim 1, wherein the computer has network connections and a said activity metric is a number of active network connections.

6. The method according to claim 1, wherein the computer is configured to monitor logons and a said activity metric is a count of logons.

7. The method according to claim 1, further comprising: controlling the computer in dependence on the net value.

8. The method according to claim 1, further comprising:

identifiing all activities of the computer over a selected period of time; and sending data identifying all the identified activities to another computer.

9. The method according to claim 8, further comprising:

creating a data set of the predetermined activities of said computer on which the monitoring program is run by;

receiving at said another computer from the monitoring program said data identifying all the identified activities;

analyzing the received data;

identifying those of said identified activities which do not contribute to a predetermined purpose of said computer on which the monitoring program is run; and storing in a data set said data identifying those of said identified activities which do not contribute to the predetermined purpose of said computer.

10. The method according to claim 9, further comprising: sending the data set from said another computer to said computer on which the monitoring program is run.

11. The method according to claim 1, wherein determining a proportion of a time period P in which the net value of a said activity metric of the computer exceeds a predetermined threshold value comprises: sampling in successive monitoring intervals t over the time period P said net value of said activity metric of the computer, and determining a proportion of monitoring intervals t in the time period P in which the net value of said at least one activity metric exceeds the predetermined threshold value.

12. The method according to claim 1, further comprising: for a second period P':

determining a second proportion of the time period P in which the net value of said activity metric of the computer exceeds a predetermined threshold value;

determining a second power consumption of the computer over the time period P; and determining for the time period P', a second proportion of power consumption for which the net value of said activity metric exceeds the predetermined threshold value.

13. The method according to claim 1, wherein the value of the power consumption of the computer at the minimum activity value of the CPU and the value of the power consumption at the maximum activity value of the CPU are predetermined values which are stored in a database.

14. The method according to claim 1, further comprising: determining the value of the power consumption in each of a succession of monitoring intervals.

15. A computer implemented method of producing a measure of performance of a computer, the computer having an operating system, comprising:

running on the computer a computer program which determines, from the operating system, total values of a plurality of activity metrics;

determining, from the operating system, values of contributions of one or more predetermined activities to each of said total values;

subtracting the values of the contributions from said total values to provide respective net values representing the measure of performance of the computer;

determining a proportion of a time period P in which the net value of a said activity metric of the computer exceeds a predetermined threshold value;

determining a power consumption of the computer over the time period P; and determining for the time period P, a proportion of power consumption for which the net value of said activity metric exceeds the predetermined threshold value;

wherein the determined power consumption is:

$$\text{PowerAtMin} + (((\text{PowerAtMax} - \text{PowerAtMin})/100) * \text{CPU value})$$

and wherein:
PowerAtMin is the power consumption of the CPU at minimum CPU activity,
PowerAtMax is the power consumption of the CPU at maximum CPU activity, and
CPU value is the average value of the CPU activity metric over the time period P.

16. The method according to claim 15, wherein the one or more predetermined activities are identified by a data set stored in a data store, and the data set is used to determine the activities the contributions of which are subtracted from said total values.

17. A computer having an operating system and a non-transitory computer readable medium storing a computer program comprising program code which, when run on said computer, causes the computer to:

determine, from the operating system, a total value of an activity metric of the computer;

determine, from the operating system, values of contributions of one or more predetermined activities to the total value; subtract the values of the contributions from the total value to provide a net value representing a measure of performance of the computer;

determine a proportion of a time period P in which the net value of said activity metric of the computer exceeds a predetermined threshold value;

determine a power consumption of the computer over the time period P; and determine for the time period P, a proportion of power consumption for which the net value of said activity metric exceeds the predetermined threshold value;

wherein the determined power consumption is:

$$\text{PowerAtMin} + (((\text{PowerAtMax} - \text{PowerAtMin})/100) * \text{CPU value})$$

and wherein:
PowerAtMin is the power consumption of the CPU at minimum CPU activity,
PowerAtMax is the power consumption of the CPU at maximum CPU activity, and
CPU value is the average value of the CPU activity metric over the time period P.

18. An article comprising a non-transitory computer readable medium storing a computer program comprising program code which, when run on a computer having an operating system, causes the computer to:

determine, from the operating system, a total value of an activity metric of a computer;

determine, from the operating system, values of contributions of one or more predetermined activities to said total value;

subtract the values of contributions from said total value to provide a net value representing a measure of performance of the computer;

determine a proportion of a time period P in which the net value of said activity metric of the computer exceeds a predetermined threshold value;

determine a power consumption of the computer over the time period P; and determine for the time period P, a proportion of power consumption for which the net value of said activity metric exceeds the predetermined threshold value;

wherein the determined power consumption is:

$$\text{PowerAtMin} + (((\text{PowerAtMax} - \text{PowerAtMin})/100) * \text{CPU value})$$

and wherein:
PowerAtMin is the power consumption of the CPU at minimum CPU activity,
PowerAtMax is the power consumption of the CPU at maximum CPU activity, and
CPU value is the average value of the CPU activity metric over the time period P.

19. The article according to claim 18, wherein the computer readable medium is a tape, disc, electronic memory or other non-transitory carrier.

20. A computer implemented method of producing measures of performance of a computer, the computer having an operating system, comprising:

running on the computer a computer program which:
identifies one or more predetermined activities within a predetermined data set;
in each of a succession of time slots, determines, from the operating system, as a net value, a value of at least one activity metric of the computer excluding contributions of the one or more predetermined activities identified from the data set to said value;
samples in each of the succession of time slots a total value of at least one other activity metric of the computer;
determines, from the operating system, a contribution of at least one predetermined activity identified in the data set to said total value;
subtracts the contribution from said total value to provide another net value;
the net values representing the measures of performance of the computer;
determines a proportion of a time period P in which the net value of a said activity metric of the computer exceeds a predetermined threshold value;
determines a power consumption of the computer over the time period P; and
determines for the time period P, a proportion of power consumption for which the net value of said activity metric exceeds the predetermined threshold value;
wherein the determined power consumption is:

$$\text{PowerAtMin} + (((\text{PowerAtMax} - \text{PowerAtMin})/100) * \text{CPU value})$$

and wherein:
PowerAtMin is the power consumption of the CPU at minimum CPU activity,
PowerAtMax is the power consumption of the CPU at maximum CPU activity, and
CPU value is the average value of the CPU activity metric over the time period P.

21. A computer having an operating system and a non-transitory computer readable medium storing a computer program comprising program code which, when run on said computer, causes the computer to:
- identify one or more predetermined activities within a predetermined data set;
- in each of a succession of time slots, determine from the operating system, as a net value, a value of at least one activity metric of the computer excluding contributions of the one or more predetermined activities identified from the data set to said value;
- sample in each of the succession of time slots a total value of at least one other activity metric of the computer;
- determine, from the operating system, contribution of at least one predetermined activity identified in the data set to said total value;
- subtract the contribution from said total value to provide another net value, the net values representing measures of performance of the computer;
- determine a proportion of a time period P in which the net value of a said activity metric of the computer exceeds a predetermined threshold value;
- determine a power consumption of the computer over the time period P; and
- determine for the time period P, a proportion of power consumption for which the net value of said activity metric exceeds the predetermined threshold value;

wherein the determined power consumption is:

$$PowerAtMin+(((PowerAtMax-PowerAtMin)/100)*CPU\ value)$$

and wherein:
- PowerAtMin is the power consumption of the CPU at minimum CPU activity,
- PowerAtMax is the power consumption of the CPU at maximum CPU activity, and
- CPU value is the average value of the CPU activity metric over the time period P.

22. An article comprising a non-transitory computer readable medium storing a computer program comprising program code which, when run on a computer having an operating system, causes the computer to:
- identify one or more predetermined activities within a predetermined data set;
- in each of a succession of time slots, determine from the operating system, as a net value, a value of at least one activity metric of the computer excluding contribution of said one or more predetermined activities identified from the data set to said value;
- sample in each of the succession of time slots a total value, derived from the operating system, of at least one other activity metric of the computer;
- determine, from the operating system, the contribution of said at least one predetermined activity identified in the data set to said total value;
- subtract the contribution from the total value to provide another net value, the net values representing measures of performance of the compute;.
- determine a proportion of a time period P in which the net value of a said activity metric of the computer exceeds a predetermined threshold value;
- determines a power consumption of the computer over the time period P; and
- determines for the time period P, a proportion of power consumption for which the net value of said activity metric exceeds the predetermined threshold value;

wherein the determined power consumption is:

$$PowerAtMin+(((PowerAtMax-PowerAtMin)/100)*CPU\ value)$$

and wherein:
- PowerAtMin is the power consumption of the CPU at minimum CPU activity,
- PowerAtMax is the power consumption of the CPU at maximum CPU activity, and
- CPU value is the average value of the CPU activity metric over the time period P.

23. The article according to claim 22, wherein the computer readable medium is a tape, disc, electronic memory or other non-transitory carrier.

* * * * *